United States Patent [19]

Jensen

[11] Patent Number: 5,437,825
[45] Date of Patent: Aug. 1, 1995

[54] POLYMER PRECURSOR FOR SILICON CARBIDE/ALUMINUM NITRIDE CERAMICS

[75] Inventor: James A. Jensen, Hockessin, Del.

[73] Assignee: Lanxide Technology Company, LP, Newark, Del.

[21] Appl. No.: 226,133

[22] Filed: Apr. 11, 1994

Related U.S. Application Data

[60] Continuation of Ser. No. 4,045, Jan. 15, 1993, which is a division of Ser. No. 836,676, Feb. 13, 1992, Pat. No. 5,229,468.

[51] Int. Cl.$^6$ .............................................. C04B 35/64
[52] U.S. Cl. ...................................... 264/56; 264/63; 264/125; 264/65
[58] Field of Search ...................... 264/56, 63, 125, 65

[56] References Cited

U.S. PATENT DOCUMENTS

| | | | |
|---|---|---|---|
| 4,687,657 | 8/1987 | Clark et al. | 423/412 |
| 4,730,026 | 3/1988 | Bolt et al. | 525/475 |
| 4,904,424 | 2/1990 | Johnson | 264/29.2 |

OTHER PUBLICATIONS

Czekaj et al., "Preparation of Silicon Carbide/Aluminum Nitride Ceramics Using Organometallic Precursors", *J. Am. Ceram. Soc.*, 73, 352–357 (1990).
Interrante et al., "An Investigation into the Preparation, Properties, and Processing of SiC/AlN and $Si_3N_4$/AlN Solid Solutions from Organometallic Precursors", *Mat. Res. Soc. Symp. Proc.*, vol. 121, 465–470, 1988.
Interrante et al., "Organometallic Precursors to AlN: Synthesis and Crystal Structures of $[(CH_3)_2AlNH_2]_3$ and the Planar Species $[(t-C_4H_9)_2AlNH_2]_3$", *Inorg. Chem.*, 28, 252–257, 1989.
Janik et al., "Reactions of Tris(trimethylsilyl) aluminum and Ammonia. Formation, Structure, and Thermal Decomposition of $[(Me_3Si)_2AlNH_2]_2$", *Inorg. Chem.*, 26, 4341–4345, 1987.
Janik et al., "Formation and Molecular Structure of the Novel Six-Coordinate Aminoalane Complex $\{[(CH_3)_3Si]_2Al(NH_2)_2\}_3Al$", *Inorg. Chem.*, 27, 4335–4338, 1988.
Schmidt et al., "Novel Polymeric Precursors to Si--C-Al-O-N Ceramic Composites", presented at the Second International Ceramic Science and Technology Congress, Nov. 12–15, 1990, Orlando Fla.
Seyferth and Brodt, "Polymeric Aluminasilazane Precursors for Aluminosilicon Nitride", Technical Report No. 32, Office of Naval Research Contract N00014-8-2-K-0322, Task No. NR P00 007, May 16, 1990.
Zhinkin et al., "Reaction of Hexamethylcyclotrisilazane with Tiethylaluminum", *Soviet Plastics*, 12, 19–21, 1964.

*Primary Examiner*—Melvyn I. Marquis
*Attorney, Agent, or Firm*—Carol A. Lewis

[57] ABSTRACT

A block copolymer is prepared by reacting an aluminumnitrogen polymer and a silazane polymer at a temperature not greater than 400° C. Block copolymers containing alkenyl or alkynyl groups can be crosslinked by supplying energy to generate free radicals, An AlN/SiC-containing ceramic is formed by pyrolyzing the crosslinked block copolymer in a nonoxidizing atmosphere.

5 Claims, No Drawings

POLYMER PRECURSOR FOR SILICON CARBIDE/ALUMINUM NITRIDE CERAMICS

This is a continuation of Ser. No. 08/004,045 filed on Jan. 15, 1993, which was a divisional of U.S. patent application Ser. No. 07/846,676, filed on Feb. 13, 1992, which issued as U.S. Pat. No. 5,229,468, on Jul. 20, 1993.

This invention relates to polymer precursors for silicon carbide ceramics containing aluminum nitride.

BACKGROUND OF THE INVENTION

Ceramic materials are of critical importance for a number of high temperature, high performance applications. These applications require a unique combination of properties such as high specific strength, high temperature mechanical property retention, low thermal and electrical conductivity, hardness and wear resistance, and chemical inertness.

Silicon carbide is an extremely hard ceramic that exhibits short-term high strength at elevated temperatures. It oxidizes slowly in air and is serviceable to about 1500° C. Silicon carbide possesses high corrosion resistance, low bulk density, and excellent creep and wear resistance. Nevertheless, microstructural instability during heating often limits the use of SiC in many such applications for extended periods of time. The morphology of SiC formed at low temperatures is cubic (beta-SiC, 3C). Alpha-SiC, which can have either hexagonal (alpha-SiC, 2H, 4H, 6H) or rhombohedral (alpha-SiC, 15R, 21R) morphologies, forms at higher temperatures. Also, beta-SiC transforms to alpha-SiC at higher temperatures. These various polytypes can undergo one or more phase transformations between 1400° C. and 2200° C., often resulting in exaggerated grain growth. Such grain growth can result in brittle failure of the ceramic under structural loading.

It is known that the presence of >1% AlN in hot-pressed SiC samples results in sintered parts having reduced grain size and improved microstructural uniformity. These phenomena have been attributed to the formation of solid solutions of the AlN in the SiC ceramic. The formation of dense bodies of SiC/AlN solid solutions from a mixture of SiC and AlN powder requires not only powder consolidation (sintering), but also thorough solid-state diffusion of the AlN into the SiC microstructure. Therefore, the high melting points and low solid state diffusivities of both AlN and SiC have limited the use of solid solution SiC/AlN ceramics. As a result, consolidated samples having representative properties have, for the most part, been prepared by pressure-assisted densification methods (e.g., hot-pressing) at relatively high temperatures (2100° C.). Such techniques are energy-inefficient and severely limit the shape complexity of the part that can be fabricated.

Polymer precursors have also been used to prepare SiC/AlN ceramics, including solid solutions. For example, J. F. Janik et al., Inorg. Chem., 1987, 26, 4341–4345, reported the synthesis of the dimer {[(CH$_3$)$_3$Si]$_2$AlNH$_2$}$_2$ by combining [(CH$_3$)$_3$Si]$_3$Al·O(C$_2$H$_5$)$_2$ and ammonia in a 1:1 ratio. Upon pyrolysis in ammonia at 900° C., a solid mixture of AlN/SiC forms. Interrante et al. in J. Am. Ceram. Soc., 1990, 73, 352–357, report the formation of solid solutions of 2H-SiC/AlN by pyrolysis of mixtures of the carbosilanes [((CH$_3$)$_3$Si)$_{0.80}$((CH$_2$=CH)CH$_3$Si)$_{1.0}$(CH$_3$HSi)$_{0.35}$]$_n$, or [CH$_3$HSiCH$_2$]$_n$ with [R$_2$AlNH$_2$]$_3$, where R=C$_2$H$_5$ or i-C$_4$H$_9$.

U.S. Patent 4,687,657 discloses a ceramic comprising a solid solution of silicon carbide and aluminum nitride formed by mixing a preceramic organosilicon polymer such as poly(diorganosilanes), poly(haloorganosilanes) and poly(carbosilanes) with a poly-N-alkyliminoalane and pyrolyzing the mixed polymers at a temperature above 1000° C. in an inert atmosphere. Seyferth and Brodt in Technical Report #32, Office of Naval Research, Contract N00014-82-K0322, May 16, 1990, report that reaction of trimethyl-aluminum with (CH$_3$SiHNH)$_n$ cyclic oligomers results in the formation of soluble, crosslinked aluminasilazanes. Pyrolysis in argon gives a good yield of aluminosilicon carbonitride. U.S. Pat. No. 4,730,026 discloses crosslinked polysilazanes in which the silazane units are linked together by at least one bridge of the formula -MR'$_n$- attached to the nitrogen atoms of silazane repeat units, where M is a metal selected from Groups IIIA, IIB, IVB and IIA of the Periodic Table. W. R. Schmidt et al. disclose preparing a single component precursor to SiC/AlN by treating 1,3,5-trivinylcyclotrisilazane with triethylaluminum. The silazane units are bridged by one -Al(C$_2$H$_5$) unit (The Second International Ceramic Science and Technology Congress, Nov. 12-15, 1990, Orlando, Fla.).

None of these polymeric AlN/SiC ceramic precursors are block copolymers in which blocks of

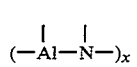

repeat units alternate with or are bridged by

repeat units where >1 and y >1, and none offer the ability to cure from a liquid to an infusible solid in a controlled fashion at low temperatures.

SUMMARY OF THE INVENTION

The block copolymers of this invention comprise a multiplicity of blocks of units having the formula

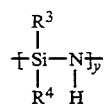

alternating with blocks of units having the formula $$\left(\begin{array}{c} R^3 \\ | \\ -Si-N- \\ | \\ R^4 \ H \end{array}\right)_y$$

wherein x >1 and y >1, R$^1$ and R$^2$ are the same or different and are selected from the group consisting of hydrogen, substituted or unsubstituted 1-12 carbon alkyl, 3-12 carbon cycloalkyl, 2-12 carbon alkenyl, 3-12 carbon cycloalkenyl, and aryl groups; R$^3$ and R$^4$ are the same or different and are selected from the group consisting of hydrogen, substituted or unsubstituted 1-6 carbon alkyl, 3-6 carbon cycloalkyl, 3-6 carbon cycloalkenyl, aryl, 2-6 carbon alkenyl and 2-6 carbon alkynyl groups, provided that $R^1$, $R^2$, $R^3$ and $R^4$ are not all hydrogen. In a preferred embodiment, the silazane units are derived from a (thio)urea-modified silazane.

Also according to the invention, these block copolymers are prepared by reacting an aluminum-nitrogen polymer containing Al-C or Al-H bonds with a silazane or a (thio)ureasilazane polymer containing N-H bonds with concomitant formation of C-H or H-H bonds to form hydrocarbon or hydrogen as a by-product. Block copolymers containing alkenyl or alkynyl groups can be cured in the presence of a free radical generator. Pyrolysis of the cured block copolymer in a nonoxidizing atmosphere yields a dense SiC/AlN ceramic.

A wide range of ceramic compositions containing SiC and AlN can be prepared from such polymeric ceramic precursors by adjusting the ratio of silazane or (thio)ureasilazane polymer to aluminum-nitrogen polymer during preparation of the block copolymer. Since these polymeric liquids can often be processed using such conventional plastics forminx techniques as coating, extrusion, and fiber spinning, a variety of intricately shaped refractory articles can be fabricated. After processing, block copolymers containinc unsaturated organic groups can be conveniently cured to a solid that does not lose its dimensional integrity upon pyrolysis. Another advantage of the use of such polymers is their chemical reactivity during pyrolysis. The stoichiometry of Si to C. to Al to N desired in the ceramic product is determined at the molecular level in the synthesis step. Therefore such compositions do not require extended treatment at high temperatures after pyrolysis to promote the solid state diffusion often required to form solid solution SiC/AlN ceramics from powder mixtures.

DETAILED DESCRIPTION OF THE INVENTION

The block copolymers of this invention are prepared by heating a mixture of an aluminum-nitrogen polymer containing Al-C or Al-H bonds and a silazane or (thio)ureasilazane polymer containing N-H bonds at a temperature not greater than 400° C., preferably from about 90° C. to about 220° C. Organic groups attached to the Al and N of the Al-N polymer or to the Si atom of the silazane or (thio)ureasilazane polymer can be free of unsaturation or some of them can be unsaturated.

Polysilazanes are well known in the art, for example, as described in U.S. Pat. Nos. 3,853,567; 4,482,669; 4,612,383; 4,675,424; 4,689,252 and 4,722,988. Addition polymers of polysilazanes that are prepared by treating a polysilazane with an isocyanate, isothiocyanate, ketene, thioketene, carbodiimide or carbon disulfide can also be used. Preparation of these addition polymers is described in U.S. Pat. No. 4,929,704.

A preferred polymer is obtained by treating a polysilazane containing N-H bonds with an iso(thio)cyanate to form a poly(thio)ureasilazane. When the resulting (thio)ureasilazane polymer is reacted with an aluminum-nitrogen polymer containing Al-C or Al-H bonds, the resulting block copolymer comprises a multiplicity of blocks of units having the formula

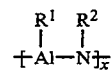

and a multiplicity of blocks of units having the formula

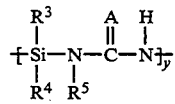

wherein $x > 1$ and $y > 1$, $R^1$ and $R^2$ are the same or different and are selected from the group consisting of hydrogen, substituted or unsubstituted 1-12 carbon alkyl, 3-12 cartcn cycloalkyl, 2-12 carbon alkenyl, 3-12 carbon cycloalkenyl, and aryl groups; $R^3$, $R^4$ and $R^5$ are the same or different are selected from the group consisting of hydrogen, substituted or unsubstituted 1-6 carbon alkyl, 3-6 carbon cycloalkyl, 3-6 carbon cycloalkenyl, aryl, 2-6 carbon alkenyl, and 2-6 carbon alkynyl groups, provided that $R^1$, $R^2$, $R^3$, $R^4$ and $R^5$ are not all hydrogen, and A is O or S Most preferred is a polyureasilazane prepared by reacting vinyl-substituted polysilazane containing N-H bonds and phenylisocyanate as described in Example C.

The aluminum-nitrogen polymers employed in the practice of this invention can be soluble or insoluble solids, or liquids of various viscosities, and have a backbone comprising alternating aluminum- and nitrogen-containing groups. Suitable polymers include aluminum amide aluminum imide polymers, aluminum imine polymers and polyaminoalanes. Polymers comprising an aluminum-nitrogen bond suitable for purposes of the present invention have a general formula selected from the group consisting of: a polymer comprising structural units of the general formula:

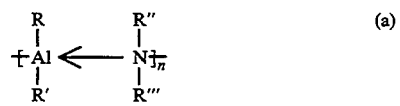

where $n > 2$ and R, R', R''and R''' are selected from the group consisting of alkyl, cycloalkyl, alkenyl, aryl, and hydrogen; a polymer comprising structural units of the general formula:

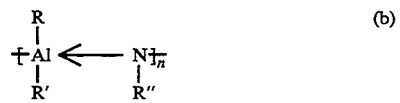

where $>2$ and R'' is an imine group, and R and R' are selected from the group consisting of alkyl, cycloalkyl, alkenyl, aryl and hydrogen; and a polymer comprising structural units of the general formula:

where $n > 2$ and R and R' are selected from the group consisting of alkyl, cycloalkyl, alkenyl, aryl and hydrogen.

Preferred aluminum-nitrogen polymers are prepared by heating the reaction product of a dialkylaluminum hydride and an organic nitrile. Most preferred is an aluminum-nitrogen polymer prepared from acetonitrile and diisobutylaluminum hydride as described in Example A.

Block copolymers containing at least one site of organounsaturation can be crosslinked, i.e., cured, by supplying energy to generate free radicals. Block copolymers containing alkenyl or alkynyl groups on silicon can also be crosslinked by heating in the presence of a free radical generator. For example, the block copolymer of Example 1 can be heated in the presence of from 0.1 wt. % to about 8 wt. % of a radical source such as a peroxide or an azo compound. The cured block copolymers are infusible solids that retain their shape upon pyrolysis and are insoluble in common organic solvents.

Suitable peroxides include for example, diaroyl peroxides such as dibenzoyl peroxide, di-p-chlorobenzoyl peroxide and bis-2,4-dichlorobenzoyl peroxide; dialkyl peroxides such as 2,5-dimethyl-2,5-di(t-butylperoxy)-hexane and di-t-butyl peroxide; diaralkyl peroxides such as dicumyl peroxide; alkyl aralkyl peroxides such as t-butyl cumyl peroxide and 1,4-bis(t-butyl-peroxyisopropyl)benzene; alkylaroyl peroxides; and alkylacyl peroxides such as tbutyl perbenzoate, t-butyl peracetate and t-butyl peroctoate. Dicumyl peroxide is preferred.

Suitable azo compounds include, for example, symmetrical or unsymmetrical azo compounds such as, for example, 2,2'-azobis(2-methylpropionitrile); 2,2'-azodimethyl-4-methoxyvaleronitrile); 1-cyano-l-(t-butylazo)cyclohexane; and 2-(t-butylazo)-isobutyronitrile. These compounds are well known and are described, for example, in U.S. Pat. Nos. 2,492,763 and 2,515,628.

The block copolymers of the present invention containing sites of organounsaturation can also be cured by exposing the polymer to UV light or electron beam radiation. Suitable UV curing agents such as alpha, alpha-dimethoxy-alpha-phenylacetophenone (DMPAP) enhance UV curing.

The block copolymers can be mixed with metal or ceramic fillers. Suitable fillers include, for example, SiC., AlN, $Si_3N_4$, $SiO_2$, BN, $Al_2O_3$, TiN, TiC., Si, Ti, Zr, Al, ZrC., $ZrO_2$, $B_4C$, $TiB_2$, HfC and $Y_2O_3$, which can be in the form of powders, whiskers or platelets. A powder, whisker or platelet which comprises a solid solution of SiC and AlN can also be used as a filler. SiC and AlN are the preferred fillers and can be present in an amount of from about 5% to about 98% by weight, based on the total weight of the polymer/SiC mixture. SiC is most preferred. Alpha-SiC., beta-SiC and mixtures thereof can be used.

Mixtures of the filler with the block copolymers can be prepared using standard ceramic mixing equipment, which includes, for example, ball mills, double planetary mixers, three roll mills, sigma blade mixers, ribbon blenders, extruders and other apparatus known to those skilled in the art. Mixtures of the block copolymer binder and fillers can be molded by processes including, for example, dry pressing, tape casting, isostatic pressing, extrusion and injection molding.

Pyrolysis of the cured or uncured block copolymers at 600° to 2200° C., preferably 1000–2000° C., in a non-oxidizing atmosphere yields silicon carbide/aluminum nitride-containing ceramic materials. The non-oxidizing atmosphere can be one that does not contain nitrogen, e.g., argon or helium, or one that does contain nitrogen, e.g., treatment with NH3 followed by treatment with N: at a higher temperature. If the atmosphere contains nitrogen, silicon nitride.will also be present in the ceramic product. Temperatures in excess of 2000° C. are typically used for densification. The amounts of SiC and AlN formed during pyrolysis depend upon the original ratio of Si introduced in the silazane component of the block copolymer and the Al introduced in the alazane component of the block copolymer. X-ray powder diffraction and energy dispersive X-ray analysis confirm the presence of both SiC and AlN phases. These phases can be in the form of an AlN/SiC solid solution or an AlN/SiC microcomposite. By microcomposite is meant a composite wherein discrete particulate domains of AlN and SiC are homogeneously interdispersed at the micron to submicron level.

The polymeric ceramic precursors of this invention can be used for forming fibers, films, coatings and monoliths, in the infiltration of a preform structure, as an adhesive or sealant, and as a binder for ceramic or metal powders.

EXAMPLE A

An aluminum-nitrogen polymer was prepared as follows. A 250 ml Schlenk round bottom flask was fitted with a pressure-equalized dropping addition funnel and purged. Acetonitrile (50 ml, 946 mmol) was added to the flask. The funnel was charged with diisobutylaluminum hydride (100 ml, 1.0 M in toluene, 100 mmol) and the flask was cooled to 0° C. The diisobutylaluminum hydride was added dropwise over 30 minutes and stirred at 0° C. for an additional hour. The flask was warmed to room temperature and the colorless solution was stirred overnight. The solvent was removed under vacuum leaving 18 g of a yellow liquid. This liquid was heated under nitrogen to 300° C. over a period of 2 hours and held at 300° C. for 6 hours to form —$(CH_3CH_2)NAl(C_4H_9)]_n$ $[(CH_3CH_2)NAl]_m$. Upon cooling, 10.6 g of a solid polymer were obtained.

EXAMPLE B

A polysilazane was prepared as follows. A 5 liter, three-necked flask was equipped with an overhead mechanical stirrer, a dry ice/acetone condenser (−78° C.), an ammonia/nitrogen inlet tube and a thermometer. The apparatus was sparged with nitrogen and then charged with hexane (1760 ml, dried over 4A molecular sieves), methyldichlorosilane (209 ml, 230.9 g, 2.0 tool) and vinylmethyldichlorosilane (64 ml, 69.6 g, 0.5 tool). The ammonia was added at a rate of 3.5 l/rain (9.37 tool) for one hour. During the addition, the temperature of the reaction rose from 25° C. to 69° C. After one hour, the ammonia flow was stopped and the reaction mixture cooled to room temperature. The reaction mixture was filtered on a glass-fritted funnel to remove the precipitated ammonium chloride. The hexane was removed from the liltrate under reduced pressure (28 nun Hg, 60° C.) to give $[(CH_3SiHNH)_{0.8}(CH_3SiCH=CH_2NH)_{0.2}]_x$ as a clear oil (150.76 g, 2.34 tool, 95% yield). The oil had a viscosity of 43 cp at 25° C.

EXAMPLE C

A polyureasilazane was prepared as described in U.S. Pat. No. 4,929,704 by treating 1451.8 g of the polysilazane, $[(CH_3SiHNH)_{0.8}(CH_3SiCH=CH_2NH)_{0.2}]_x$, prepared as described in Example B, with 6.62 ml phenylisocyanate and heating the mixture to 70° C. for 1 hour.

EXAMPLE 1

A block copolymer was prepared by combining 10.0 g of the polysilazane, $[(CH_3SiHNH)_{0.8}(CH_3Si(CH=CH_2)NH)_{0.2}]_x$, prepared as described in Example B, and 7.2 g of the aluminum-nitrogen polymer,

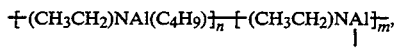

prepared as described in Example A, and heating under nitrogen to 110° C. for 5 hours. Isobutane was formed as a by-product of the reaction. The resulting block copolymer is an orange liquid.

EXAMPLE 2

A 6.0 g sample of the block copolymer of Example 1 was combined with 0.1 g dicumyl peroxide in a vial under nitrogen. The sample was heated to 150° C. for 15 minutes to form a cured infusible solid.

EXAMPLE 3

A 1.0 g sample of the liquid block copolymer of Example was combined with 0.02 g of azo(bis)isobutyronitrile (AIBN) in a vial under nitrogen. The sample was heated to 145° C. for 30 minutes. The sample cured to a rigid solid.

EXAMPLE 4

A 1.13 g sample of the cured block copolymer of Example 2 was fired in a graphite boat from room temperature to 1600° C. at 10° C./min in an argon atmosphere with a two hour hold at 1600° C. The resulting ceramic, 0.64 g, was shown by X-ray powder diffraction to be crystalline $\alpha$-SiC/AlN. 2H $\alpha$-SiC was the only SiC polytype detected.

EXAMPLE 5

A 1.0 g sample of the cured block copolymer of Example 2 was fired in an alumina boat in a mullite tube furnace from room temperature to 1000° C. in ammonia and held for 2 hours at 1000° C. The atmosphere was then switched to nitrogen and the temperature was ramped to 1600° C. at 10° C./min. The sample was held at 1600° C. for 2 hours. The resulting ceramic was shown by X-ray diffraction to contain $Si_3N_4$, AlN and SiC.

EXAMPLE 6

A 1 g sample of the liquid block copolymer of Example 1 was filled with silicon carbide powder (0.5 g). Dicumyl peroxide (0.02 g, 2 wt. % based on polymer) was added and the mixture heated at 160° C. under nitrogen for 5 minutes to form a rigid, cured solid piece.

EXAMPLE 7

A 0.5 g sample of the block copolymer of Example 1 was transferred under nitrogen to a quartz flask and mixed with 0.02 g of the UV curing agent alpha, alpha-dimethoxy-alphaphenylacetophenone sold by Ciba-Geigy under the trade name IRGACURE 651. The flask was exposed to UV under a low pressure mercury lamp for 4 hours. A solid cured polymer formed.

EXAMPLE 8

A block copolymer was prepared by combining 10.0 g of the isocyanate-modified polysilazane prepared as in Example C, and 7.2 g of the alazane polymer,

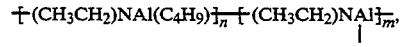

prepared as in Example A, and heating under nitrogen to 110° C. for 4 hours. Isobutane is formed as a by-product of the reaction. The resulting block copolymer was an orange liquid.

EXAMPLE 9

A 2.1 g sample of the block copolymer of Example 8 was combined with 0.04 g (2 wt. %) dicumyl peroxide in a vial under nitrogen. The sample was heated to 150° C. for 15 minutes to form a cured, infusible solid.

EXAMPLE 10

A 2.1 g sample of the liquid block copolymer of Example 8 was combined with 0.04 g of AIBN (azo(bis)isobutyronitrile) in a vial under a flow of nitrogen. The sample was heated to 150° C. for 30 minutes. The sample cured to a rigid solid.

EXAMPLE 11

A 0.5 g sample of the block copolymer of Example 8 was transferred under nitrogen to a quartz flask and mixed with 0.02 g of the UV curing agent alpha, alpha-dimethoxy-alpha-phenylacetophenone sold by Ciba-Geigy under the trade name IRGACURE 651. The flask was exposed to UV under a low pressure mercury lamp for 4 hours. A solid cured polymer was obtained.

EXAMPLE 12

A 1.0 g sample of the cured block copolymer of Example 9, was fired in an alumina boat from room temperature to 1500° C. at 10° C./min in an argon atmosphere with a two hour hold at 1500° C. The resulting ceramic, 0.23 g, was shown b, X-ray powder diffraction to be crystalline $\alpha$-SiC/AlN. 2H $\alpha$-SiC was the only SiC polytype detected.

EXAMPLE 13

A 2.0 g sample of the liquid block copolymer of Example 8 was filled with silicon carbide powder (1.0 g). Dicumyl peroxide (0.04 g, 2 wt. % based on polymer) was added and the mixture heated at 160° C. under nitrogen for 5 minutes to form a rigid cured solid piece.

EXAMPLE 14

This example demonstrates that a block copolymer is formed by the reaction of a polysilazane and an aluminum-nitrogen polymer.

Deuterated polysilazane, with deuterium labels on the nitrogen atoms, was prepared according to the method of Example B by using a 500 ml three-necked flask equipped with a magnetic stir bar, a dry ice/isopropanol condenser ($-78°$ C.), an ammonia/nitrogen inlet tube and a thermometer. The apparatus was sparged with nitrogen and then charged with hexane (175 ml, dried over 4A molecular sieves), methyldichlorosilane (5.5 ml, 0.053 mol) and vinylmethyldichlorosilane (1.69 ml, 0.013 mol). The solution was cooled to 0° C. in an ice bath and $d_3$-ammonia (5 1, 0.20 mol) was added over 30 minutes with stirring. The reaction mixture was filtered on a glass-fritted funnel to remove precipitated ammonium chloride. The hexane was removed under reduced pressure to give $[(CH_3SiHND)_{0.8}(CH_3Si(CH=CH_2)ND)_{0.2}]_x$ as a clear oil.

The alazane

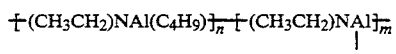

(0.72 g), prepared as in Example A, was dissolved in 1.0 g of the deuterated polysilazane [(CH$_3$SiHND)$_{0.8}$(CH$_3$Si(CH=CH$_2$)ND)$_{02}$]$_x$. A 0.5 g sample of this polymer mixture was transferred under argon to an oven-dried vial and sealed with a septum. The sample was heated to 110° C. for 3.5 hours, then cooled to room temperature. The gas headspace was analyzed by gas chromatography/Fourier Transform infrared spectroscopy. d$_1$-Isobutane was identified by comparison to known GC standards and by the observation of C–D stretching bands at 2160 cm$^{-1}$ in the infrared spectrum. d$_1$-Isobutane can only be obtained by reaction of a silazane Si-N-D group with an alazane Al-C$_4$H$_9$ group, which forms C$_4$H$_9$D with concomitant Si-N-Al bond formation.

EXAMPLE 15

The liquid polysilazane [CH$_3$Si (H) NH]$_x$ was prepared according to the method of Example B using methyldichlorosilane and ammonia.

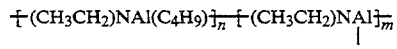

(1.4 g), prepared as in Example A, was dissolved in [CH$_3$Si (H) NH]$_x$ (3.0 g). The polymer solution was heated to 200° C. for 4 hours under nitrogen. Isobutane was formed as a by-product of the reaction. At 190° C. the solution viscosity began to increase, ultimately resulting in a solid block copolymer that contained no unsaturated organic groups.

EXAMPLE 16

The solid block copolymer of Example 15 (1.0 g) was fired in a mullire tube furnace under an argon atmosphere in an alumina boat from room temperature to 1500° C. at 5° C./minute. The sample was held two hours at 1500° C. and 0.89 g of fired product was isolated. X-ray powder diffraction of the fired product showed α-SiC and AlN as the only crystalline products.

EXAMPLE 17

A block copolymer was prepared by combining 6.4 g of the polysilazane, [(CH$_3$SiHNH)$_{0.8}$(CH$_3$Si(CH=CH$_2$)NH)$_{0.2}$]$_x$, prepared as described in Example B and 3.8 g of the aluminum-nitrogen polymer,

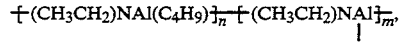

prepared as described in Example A, and heating under nitrogen to 110° C. for 4 hours. Isobutane was formed as a by-product of the reaction. A spin dope was prepared by mixing 0.3 g of the block copolymer with 0.01 g of dicumyl peroxide. Fibers were drawn from the spin dope, heated to 180° C. in nitrogen to crosslink the fiber to establish dimensional stability and then fired to 1500° C. at 10° C./minute in an argon atmosphere. The fibers retained their shape on firing. X-ray powder diffraction of the fixed fibers showed α-SiC and AlN as the only crystalline phases.

I claim:

1. In a reaction injection molding process for preparing a sintered ceramic article comprising:
   (a) injecting into a heated mold a mixture comprising at least one powder selected from the group consisting of a ceramic powder and a metal powder, and a curable ceramic precursor binder phase that is a liquid, , said powder being present in an amount sufficient to cure the binder phase of said mixture and produce a molded article,
   (b) heating the molded article to a temperature sufficient to convert the cured binder phase to a ceramic, and
   (c) sintering the article in the presence of a non-oxidizinq atmosphere,
   the improvement comprising using as the curable, liquid ceramic precursor binder phase at least one polymer that contains at least one metallic element within said at least one polymer and forms at least two compositionally distinct ceramics upon pyrolysis under said non-oxidizing atmosphere, wherein said curable ceramic precursor phase comprises at least one block copolymer comprising a multiplicity of blocks of units having the formula

alternating with a multiplicity of blocks of units having the formula

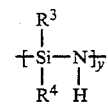

wherein x >1 and y >1, R$^1$ and R$^2$ are the same or different and are selected from the group consisting of hydrogen, substituted or unsubstituted 1-12 carbon alkyl, 3-12 carbon cycloalkyl, 2-12 carbon alkenyl, 3-12 carbon cycloalkenyl, and aryl groups; R$^3$ and R$^4$ are the same or different and are selected from the group consisting of hydrogen, substituted or unsubstituted 1-6 carbon alkyl, 3-6 carbon cycloalkyl, 3-6 carbon cycloalkenyl, 2-6 carbon alkenyl, 2-6 carbon alkynyl, and aryl groups, provided that R$^1$ R$^2$ R$^3$ and R$^4$ are not all hydrogen.

2. The process of claim 1, wherein at least one of R$^1$, R$^2$, R$^3$ and R$^4$ is a vinyl group.

3. In a reaction injection molding process for preparing a sintered ceramic article comprising:
   (a) injecting into a heated mold a mixture comprising at least one powder selected from the group consisting of a ceramic powder and a metal powder and a curable ceramic precursor binder phase that is a liquid, said powder being present in an amount sufficient to cure the binder phase of said mixture and produce a molded article,
   (b) heating the molded article to a temperature sufficient to convert the cured binder phase to a ceramic, and
   (c) sintering the article in the presence of a non-oxidizinq atmosphere,
   the improvement comprising using as the curable, liquid ceramic precursor binder phase at least one polymer that contains at least one metallic element within said at least one polymer and forms at least two compositionally distinct ceramics upon pyrolysis under said non-oxidizing atmosphere, wherein said curable ceramic precursor phase comprises at least one block copolymer comprising a multiplicity of blocks of units having the recurring formula

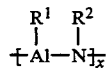

alternating with a multiplicity of blocks of units having the formula

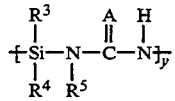

wherein $x > 1$ and $y > 1$, $R^1$ and $R^2$ are the same or different and are selected from the group consisting of hydrogen, substituted or unsubstituted 1–12 carbon alkyl, 3–12 carbon cycloalkyl, 2–12 carbon alkenyl, 3–12 carbon cycloalkenyl, and aryl groups; $R^3$, $R^4$ and $R^5$ are the same or different and are selected from the group consisting of hydrogen, substituted or unsubstituted 1–6 carbon alkyl, 3–6 carbon cycloalkyl, 3–6 carbon cycloalkenyl, aryl, 2–6 carbon alkenyl, 2–6 carbon alkynyl, and A is 0 or S, provided that $R^1$, $R^2$, $R^3$, $R^4$ and $R^5$ are not all hydrogen.

4. The process of claim 3, wherein the organosaturated group is a vinyl group.

5. The process of claim 3 wherein $R^4$ is vinyl, $R^5$ is phenyl and A is 0.

* * * * *